United States Patent [19]

Miller

[11] Patent Number: 4,585,264

[45] Date of Patent: Apr. 29, 1986

[54] FOLDING RACK FOR TRUCKS

[76] Inventor: Roger Miller, 2232 E. Vista, Missoula, Mont. 59802

[21] Appl. No.: 613,316

[22] Filed: May 23, 1984

[51] Int. Cl.$^4$ .......................... B62D 33/08; B60P 3/42
[52] U.S. Cl. ........................................ 296/3; 296/13; 296/14; 296/26; 296/32; 105/379
[58] Field of Search ........................................ 296/3-7, 296/10, 13, 14, 26, 27, 32; 280/79.3; 105/379; 16/277, 289, 291, 293, 304, 306

[56] References Cited

U.S. PATENT DOCUMENTS

| | | | |
|---|---|---|---|
| 770,773 | 9/1904 | McGuirk, Jr. et al. | 296/27 |
| 1,585,653 | 5/1926 | Dath | 16/306 |
| 1,610,065 | 12/1926 | Meyer | 296/26 |
| 2,856,225 | 10/1958 | Selzer | 296/32 |
| 2,993,727 | 7/1961 | Zewiske | 296/27 |
| 3,365,230 | 1/1968 | Langdon | 296/3 |
| 3,372,829 | 3/1968 | Averill | 280/79.3 |
| 3,460,864 | 8/1969 | Piercy | 296/3 |
| 3,768,858 | 10/1973 | Boismier | 296/100 |

FOREIGN PATENT DOCUMENTS

| | | | |
|---|---|---|---|
| 716091 | 12/1931 | France | 296/32 |
| 1554791 | 12/1968 | France | 296/10 |

*Primary Examiner*—Robert B. Reeves
*Assistant Examiner*—Dennis H. Pedder
*Attorney, Agent, or Firm*—Henderson & Sturm

[57] ABSTRACT

A rack for a truck bed which includes separate front and side assemblies, each assembly utilizing a lower frame having dowels for selective insertion into openings into truck bed edges or permanent sidewalls. A first rack member is pivotally attached to each frame of each respective assembly by hinges which are spring biased to cause the first respective rack member to be in folded position wherein the respective first rack member is disposed beside the respective frame and is movable to an extended position wherein the respective first rack member is disposed about the respective frame member. A second rack member of each respective assembly is pivotally attached to a respective one of said first rack member by hinges which are spring biased to cause the second rack member to be in a folded position wherein the respective second rack member is disposed beside the respective first rack member and is movable from such folded position to an extended position in alignment with a respective one of the first rack members. Locking mechanisms are provided for selectively locking the front assembly to the side assemblies whereby such assemblies will be held in the extended position. Locking mechanisms are also provided for selectively locking the assemblies in a folded position.

5 Claims, 13 Drawing Figures

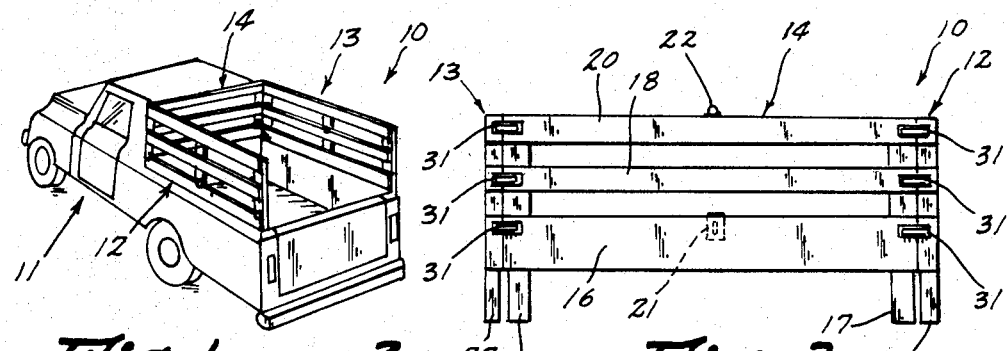
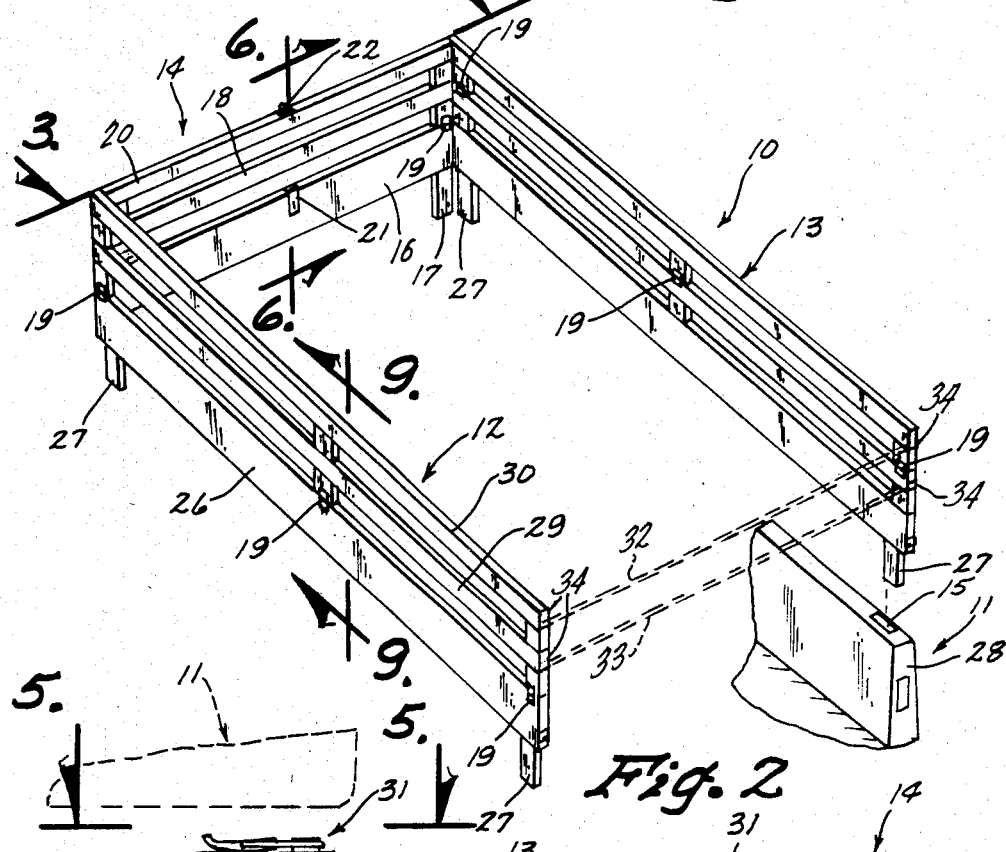
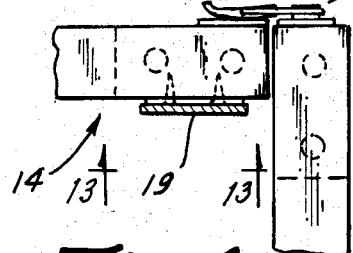
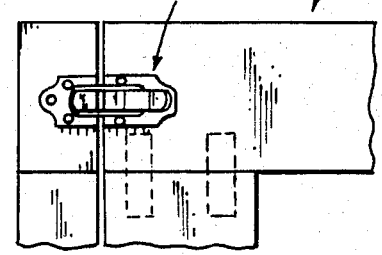

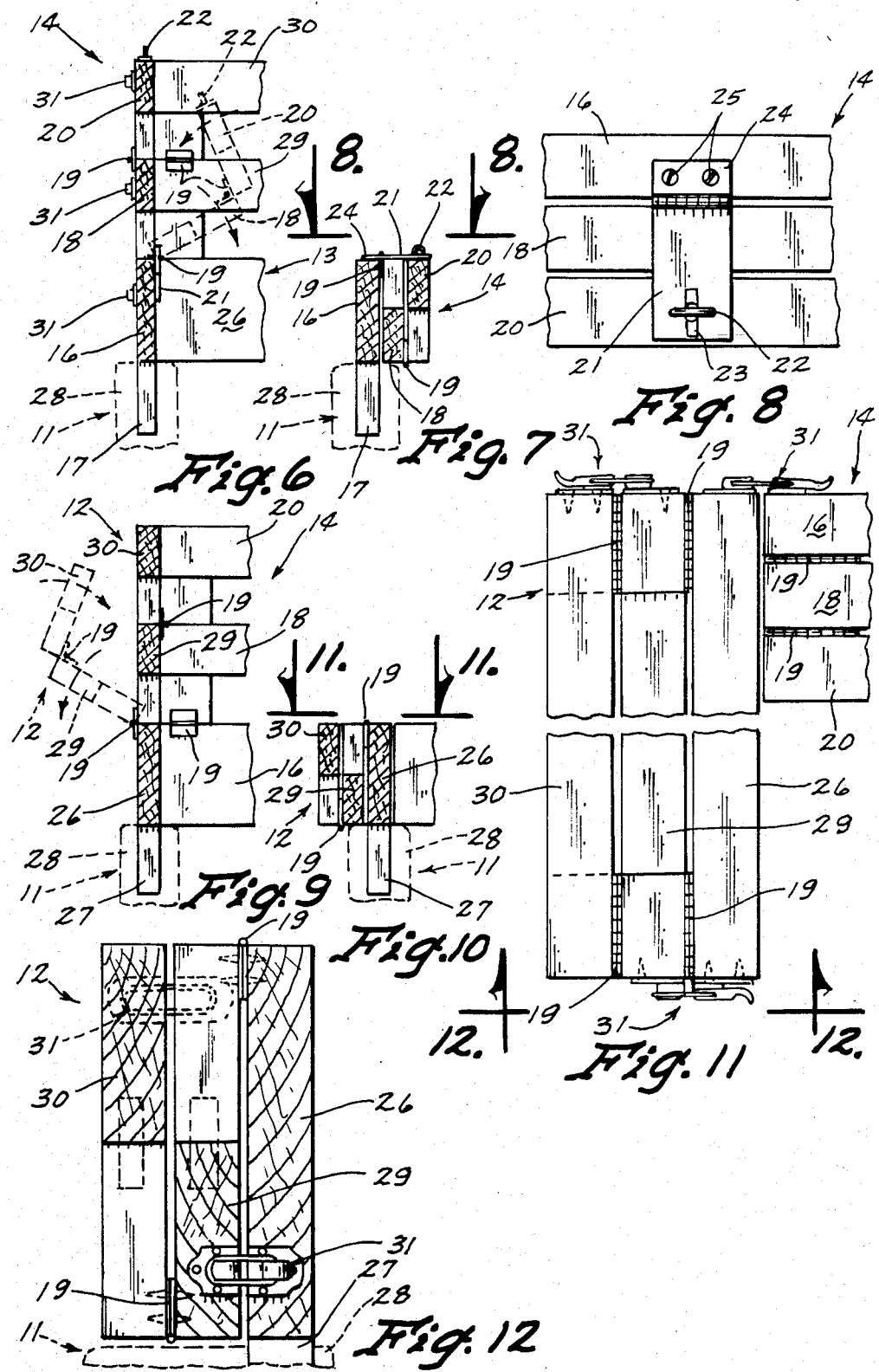

FOLDING RACK FOR TRUCKS

TECHNICAL FIELD

The present invention relates to a rack for trucks and more particularly to such a rack which folds along at least two horizontal axes on each of the sides thereof.

BACKGROUND ART

Racks for truck beds to extend the effective height thereof have been known for many years. For example, U.S. Pat. No. 3,365,230 to Langdon shows such a rack. U.S. Pat. No. 2,856,225 to Selzer shows numerous rack arrangements for use in various hauling jobs. U.S. Pat. No. 2,993,727 to Zewiske shows a folding rack having an extended position useful for hauling livestock in the like and a folded position useful for hauling other types of cargo. U.S. Pat. No. 3,460,864 shows a collapsible rack for a truck bed.

As can be appreciated from the foregoing examples of the prior art, there have been many different approaches to the problem of how to extend the effective height of a truck bed. Despite all of the activity in this field, there still exists a need for folding racks which are simple to use, economical to construct and dependable in use.

One problem with prior art racks is that while they are needed to stabilize a high load, the rack itself often gets in the way of the actual loading process. Consequently, there is also a need for a folding rack having one or more assemblies which can easily and quickly be folded down for loading and easily and quickly folded up after the load is on the truck bed.

DISCLOSURE OF THE INVENTION

The pesent invention relates to a rack for a truck bed. The rack includes separate front and side assemblies, each assembly utilizing a lower frame having dowels for selective insertion into openings into truck bed edges or permanent sidewalls. A first rack member is pivotally attached to each frame of each respective assembly by hinges which are spring biased to cause the first respective rack member to be in folded position wherein the respective first rack member is disposed beside the respective frame and is movable to an extended position wherein the respective first rack member is disposed above the respective frame member. A second rack member of each respective assembly is pivotally attached to a respective one of said first rack member by hinges which are spring biased to cause the second rack member to be in a folded position wherein the respective second rack member is disposed beside the respective first rack member and is movable from such folded position to an extended position in alignment with a respective one of the first rack members. Locking mechanisms are provided for selectively locking the front assembly to the side assemblies whereby such assemblies will be held in the extended position. Locking mechanisms are also provided for selectively locking the assemblies in a folded position.

An object of the present invention is to provide an improved rack for trucks.

Another object of the invention is to provide a folding rack for a truck which is easily raised and lowered.

A further object of the invention is to provide a rack of the aforementioned type which can be left on the truck when not in use, in either a folded or extended position.

A still further object of the present invention is to provide a rack of the aforementioned type which does not obstruct the vision of the truck operator.

Another object is to provide a rack of the aforementioned type which permits either or both of the sides to be folded down for loading or unloading and yet permit them to be easily and quickly extended upwardly for stabilizing the load during transit.

Other objects, advantages and novel features of the present invention will become apparent from the following description of the best mode for carrying out this invention when considered in conjunction with the accompanying drawings.

BRIEF DESCRIPTION OF THE DRAWINGS

FIG. 1 shows a perspective view of a preferred embodiment of a rack constructed in accordance with the present invention shown installed onto a pickup truck and in an extended position thereof;

FIG. 2 is a perspective view of the rack of the present invention shown enlarged and in an extended position on all three sides thereof;

FIG. 3 is a view of the front portion of the rack taken along line 3—3 of FIG. 2;

FIG. 4 is an enlarged partial top view of the front right corner of the rack shown in FIG. 2;

FIG. 5 is a partial view taken along line 5—5 of FIG. 4;

FIG. 6 is a cross-sectional view taken along line 6—6 of FIG. 2;

FIG. 7 is a view like FIG. 6, but showing the front rack in a folded position;

FIG. 8 is a partial view taken along line 8—8 of FIG. 7;

FIG. 9 is a cross-sectional view taken along line 9—9 of FIG. 2;

FIG. 10 is a view like FIG. 5, but showing the side rack portion in a folded position thereof;

FIG. 11 is an enlarged partial top view of the left side and part of the left front of the rack of the preferred embodiment of the invention as shown in the folded position thereof and showing the mechanisms for locking the various parts of the rack together;

FIG. 12 is a view taken along line 12—12 of FIG. 11, showing the rear end of one side of the rack of the preferred embodiment.

BEST MODE FOR CARRYING OUT THE INVENTION

Figure 13:
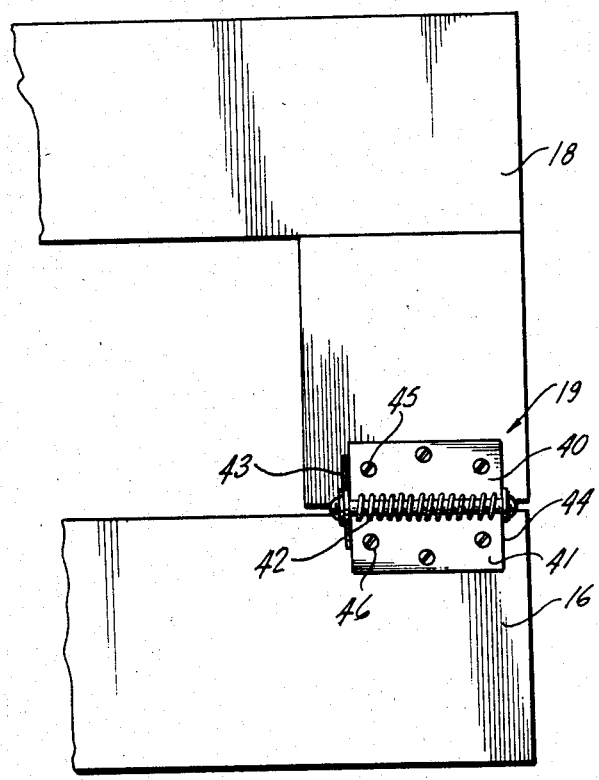
FIG. 13 is a view taken along line 13—13 of FIG. 4.

Referring now to the drawings wherein like reference numerals designate identical or corresponding parts throughout the several views, FIG. 1 shows a rack (10) constructed in accordance with the present invention installed onto a pickup truck (11). The rack (10) includes side assemblies (12) and (13) and a front assembly (14). The front assembly (14) includes a frame (16) having downwardly extending dowels (17) attached thereto for being received within complementary openings within the sidewalls of the pickup truck (11).

A first rack member (18) is pivotally attached to frame (16) by hinges (19). A second rack member (20) is connected to the first rack member (18) by hinges (19) that can best be seen in FIGS. 6 and 7. As can readily be appreciated from viewing FIGS. 6 and 7, the front assembly (14) can easily be folded from an extended position as shown in FIG. 6 to a folded position as shown in FIG. 7 because of the provision of the hinges (19). In the preferred embodiment thereof, these hinges (19) are spring biased to cause the rack to move to the folded position but it will be understood to those skilled in this art that the spring hinges (19) can be utilized to bias the first and second rack members to the extended position, if such an arrangement is desired.

Referring to FIG. 13, note that a spring (42) is shown biasing the plates (40) and (41) of hinge (19) apart so as to bias the frame (16) and rack member (18) to the extended position thereof. Screws (45) attach plate (40) to rack member (18) and screws (46) attach plate (41) to frame (16). Ends (43) and (44) of spring (42) contact plates (40) and (41) respectively.

A latch hasp type of locking mechanism including element (24) rigidly attached to frame member (16) by screws (25) and member (21) which is pivotally attached to element (24). Member (21) has an opening (23) therein for reception of a projection (22) which can be aligned with the opening (23) in the member (21) and then rotated to selectively lock the frame and first and second rack members (18) and (20) together as shown in FIGS. 7 and 8.

Referring now to FIGS. 9 and 10, it is noted that the first side assembly (12) is shown in cross-section. The first side assembly (12) is basically a mirror image of the second side assembly (13), so a description of the first side assembly (12) will clearly teach one of ordinary skill in this art how the second side assembly (13) operates and is constructed. It is noted in FIG. 9 that a frame (26) has a pair of dowels (27) extending from the bottom thereof and that these dowels (27) extend into openings in sidewalls (28) of the pickup (11). Hinges (19) are utilized to pivotally attach the first rack member (29) of the first side assembly (12) to the second rack member (30) of the first side assembly (12). These hinges (19) are identical to the hinges referred to above with regard to FIGS. 6 and 7. Side assemblies (12) and (13) differ from the front assembly (14) basically in fact that they fold outwardly from the inside of the pickup box (28) whereas the front assembly (14) folds inwardly as will be clearly appreciated from viewing the FIGS. 6, 7 and 8.

The first side assembly (12) is attached at the front thereof to the front assembly (14) by a plurality of utility latches (31) which cause the front assembly and the first and second side assemblies (12) and (13) to be held up together in a rigid fashion. (See FIGS. 3, 4 and 5). It is noted that the rack member 18 is prevented from pivoting beyond the extended position shown in solid lines in FIG. 6 from the position shown in dashed lines because of the stop structure formed by abutment of members 16 and 18 in the extended position thereof. Similar stop structures are formed between rack members 18 and 20 (FIG. 6), between frame and rack members 26 and 29 (FIG. 9) and between rack members 29 and 30 (FIG. 9).

Referring to FIG. 2, it will be noted that optional rigid stress bars (32) and (33) can be attached to the rear end of each of the first and second assemblies (12) and (13) for reinforcement when hauling a heavy load or for preventing the rack from rattling around or becoming loose when no load is present and the rack is in an extended position. These bars can be attached by utilizing utility brackets (34) or in many other ways just so to permit easy attachment to and removable from the first and second side assemblies (12) and (13).

In operation, the present invention would be attached to a pickup truck (11) by inserting the front assembly (14) into the openings of pickup truck box by inserting the dowels (17) therein and then by attaching the first and second side assemblies (12) and (13) in a similar fashion by inserting the dowels (27) into openings (15) in the sidewalls (28) of the pickup truck (11). (See FIG. 2). Typically in this installation, the front assembly (14) and the side assemblies (12) and (13) would be in the folded position shown in FIG. 11 during this initial process, and the bottom most utility latch (31) would be utilized to attach the front and side assemblies together. Then, if it is desired to load the truck (11), the front assembly (14) would be folded upwardly in the fashion shown proceeding from FIG. 7 to FIG. 6 wherein the latch, including members (21) and (22), would be loosened and the first and second rack members (18) and (20) would be pivoted upwardly from the position shown in FIG. 7 to the position shown in dashed lines in FIG. 6, and then ultimately into the position shown in solid lines in FIG. 6. Once the first and second rack members (18) and (20) have been so moved into the extended position shown in solid lines in FIG. 6, then the top-most latches (31) (FIG. 3) would be utilized to connect front assembly (14) to the side assemblies, for example, as shown in FIG. 3.

Referring to FIG. 12, it is noted that a locking latch 31 locks one end of the frame (26) to one end of the first rack member (29) to hold rack member (29) in the folded position. Similarly a second locking latch (31) shown in dashed lines in FIG. 12 is useful to hold the rack member (30) from moving with respect to rack member (29) to prevent the first assembly (12) from rattling when the truck is moving with the rack (10) in the folded position. Since the second side assembly (13) is a mirror image of the first side assembly (12), corresponding locking latches (31) are attached to corresponding frame and rack members on second side assembly (13).

If it would be desirable to load the load onto the pickup bed from one side thereof, then the side assembly on that particular side could be lowered by unfastening the utility latches (31) and lowering the side down from the position shown in solid lines in FIG. 9 to the position shown in FIG. 10. Then when the loading process in completed, the first and second rack members (29) and (30) would be moved upwardly from the position shown in FIG. 10 to the position shown in FIG. 9 in solid lines, and the utility latches (31) would again be used to hold the side assembly in an extended position for hauling the load from place to place. Optionally, stress bars (32) and (33) could be attached to the rear end of the first and second assemblies (12) and (13), especially when heavy loads are being hauled.

Accordingly, it will be appreciated that all of the foregoing objects have been accomplished. Obviously, many modifications and variations of the present invention are possible in light of the above teachings. It is therefore to be understood that, within the scope of the appended claims, the invention may be practiced otherwise than as specifically described.

I claim:

1. A folding rack for a truck having a truck bed with an inside and an outside comprising:
   a first side assembly including:
   a frame having an inside and an outside with respect to said truck bed;

means for removably attaching said frame to one side of said truck bed;

a first rack member having an extended and a folded position thereof;

first hinge means attached to a top portion of said outside of said frame and to the outside of said first rack member when in the extended position thereof for operably pivotally attaching said first rack member to said frame between said extended position whereby said first rack member is directly above said frame and said folded position whereby said first rack member is folded along the outside of said frame, said first hinge means including means for biasing said first rack member to one of the folded or extended positions thereof;

a second rack member having an extended and folded position thereof;

second hinge means attached to the inside of said first rack member and to the inside of said second rack member when in the extended position thereof for pivotally attaching said second rack member to said first rack member between said extended position in alignment with said first rack member and said folded position along the outside of said first rack member, said second hinge means including means for biasing said second rack member to one of the folded or extended positions thereof;

means for operably locking one end of said first rack member to one end of said frame when the first rack member is in said folded position thereof;

means for operably locking one end of said second rack member to the other end of said first rack member when the second rack member is in the folded position thereof with respect to the first rack member;

a second side assembly including:

a second frame having an inside and an outside with respect to said truck bed;

means for removably attaching said second frame to the other side of the truck bed;

a third rack member having an extended and folded position thereof;

third hinge means attached to an outside top portion of said other side of the second frame and to the outside of said third rack member when in the extended position thereof for pivotally attaching said third rack member to said second frame between said extended position whereby said third rack member is directly above said second frame and said folded position whereby said third rack member is folded along the outside of said second frame;

a fourth rack member having an extended and folded position thereof;

fourth hinge means attached to a a top inside portion of said third rack member when in the extended position thereof and to the inside of said fourth rack member when in the extended position thereof for pivotally attaching said fourth rack member to said third rack member between said extended position in alignment with said third rack member and said folded position disposed along the outside of said third rack member;

means for operably locking said third rack member to said second frame when the third rack member is in said folded position thereof;

means for operably locking the fourth rack member to the third rack member when the fourth rack member is in the folded position thereof with respect to the third rack member;

a front assembly including:

a third frame having an inside and an outside with respect to said truck bed;

means for removably attaching said third frame to the front of said truck bed;

a fifth rack member having an extended and a folded position thereof;

fifth hinge means attached to an inside top portion of said third frame and to the inside of said fifth rack member when in the extended position thereof for pivotally attaching said fifth rack member to said third frame between said extended position whereby said fifth rack member is directly above said third frame and a folded position whereby said fifth rack member is folded along the inside of said third frame;

a sixth rack member having an extended and a folded position thereof;

sixth hinge means attached to an outside top portion of said fifth rack member when in the extended position thereof and to the outside of said sixth rack member when in the extended position thereof for pivotally attaching said sixth rack member to said fifth rack member between said extended position in alignment with said fifth rack member and said folded position disposed along the inside of said fifth rack member;

means attached to said third frame for operably preventing relative movement of said fifth and sixth rack member and said third frame when the fifth and sixth rack members are in the folded position thereof;

locking latches positioned at a front side of the folding rack for independently, selectively, operably attaching said first side assembly to said front assembly when said first, second, fifth and sixth rack members are in the extended positions thereof; and locking latches positioned at a front side of the folding rack for independently, selectively, operably attaching the second side assembly to said front assembly when the third, fourth, fifth and sixth rack members are in the extended position thereof for causing the respectively interconnected assemblies to help support each other and for permitting either one of the first and second side assemblies to be independently lowered for permitting loading or unloading from one side while the other side assembly and the front assembly can be up and connected together to support the cargo within said rack wherein the attachment and disassembly of the side and front assemblies in the extended position are facilitated.

2. The rack of claim 1 including at least one optional stress bar means extending from and selectively and removably attached to the back of the first side assembly and to the back of the said second side assembly for stabilizing the rear portion of the rack.

3. The rack of claim 1 including stop means on said first and second rack members to prevent them from pivoting beyond said extended position.

4. The rack of claim 3 including stop means on said first frame and first rack member to prevent said first rack member from pivoting beyond said extended position thereof.

5. The rack of claim 1 including separate stop means associated with each of said first frame and said first rack member, said first and second rack members, said second frame and said third rack member, said third and fourth rack members, said third frame and said fifth rack member and said fifth and sixth rack members for preventing said respective frame members from pivoting beyond said extended position thereof.

* * * * *